US009187163B2

(12) United States Patent
Rohden

(10) Patent No.: US 9,187,163 B2
(45) Date of Patent: Nov. 17, 2015

(54) MAGNUS ROTOR COMPRISING A GUIDE ROLLER COVER

(75) Inventor: Rolf Rohden, Aurich (DE)

(73) Assignee: Wobben Properties GmbH, Aurich (DE)

( * ) Notice: Subject to any disclaimer, the term of this patent is extended or adjusted under 35 U.S.C. 154(b) by 53 days.

(21) Appl. No.: 13/822,856

(22) PCT Filed: Sep. 15, 2011

(86) PCT No.: PCT/EP2011/065984
§ 371 (c)(1),
(2), (4) Date: Jun. 4, 2013

(87) PCT Pub. No.: WO2012/035090
PCT Pub. Date: Mar. 22, 2012

(65) Prior Publication Data
US 2013/0239859 A1  Sep. 19, 2013

(30) Foreign Application Priority Data
Sep. 16, 2010 (DE) .......................... 10 2010 040 919

(51) Int. Cl.
*B63H 9/02* (2006.01)
(52) U.S. Cl.
CPC .. *B63H 9/02* (2013.01); *Y02T 70/58* (2013.01)
(58) Field of Classification Search
CPC ....................................................... B63H 9/02
USPC ........................................... 114/39.3; 416/4
See application file for complete search history.

(56) References Cited

U.S. PATENT DOCUMENTS

| 1,697,779 | A | | 1/1929 | Roos |
| 4,193,305 | A | * | 3/1980 | Hunter ............................ 73/462 |
| 4,401,284 | A | | 8/1983 | Austin |
| 4,602,584 | A | | 7/1986 | North et al. |
| 2009/0241820 | A1 | | 10/2009 | Rohden |

FOREIGN PATENT DOCUMENTS

| AT | 110303 | 8/1928 |
| CH | 116 268 | 8/1926 |
| CN | 101454197 A | 6/2009 |
| DE | 558 426 | 9/1932 |
| DE | 1 792 436 | 7/1959 |
| DE | 54 215 | 11/1969 |

(Continued)

OTHER PUBLICATIONS

Muhs, D. et al., "ROLOFF/MATEK: Maschinenelemente", 17th edition, Wiesbaden: Friedr. Verweig & Sohn Verlag/GWV Fachverlage GmbH, 2005, 6 pages—ISBN 3-528-17028-X.

(Continued)

*Primary Examiner* — Edwin Swinehart
(74) *Attorney, Agent, or Firm* — Seed IP Law Group PLLC

(57) ABSTRACT

The present invention concerns a Magnus rotor comprising a guide roller which is arranged at the lower outer periphery of the Magnus rotor and which bears against the Magnus rotor in play-free relationship, a walkway surface arranged beneath the guide roller, and a cover which covers the guide roller and the walkway surface. In an opened condition the cover exposes the guide roller and the walkway surface so that a person on the walkway surface can perform working operations at the guide roller.

12 Claims, 8 Drawing Sheets

(56) References Cited

FOREIGN PATENT DOCUMENTS

| | | |
|---|---|---|
| DE | 3402065 C1 | 4/1985 |
| DE | 255923 A1 | 4/1988 |
| DE | 3927712 C2 | 6/1993 |
| DE | 699 16 676 T2 | 6/2005 |
| DE | 102005062615 A1 | 6/2007 |
| DE | 102006025732 A1 | 12/2007 |
| EP | 1443262 A2 | 1/2004 |
| GB | 2 332 891 A | 7/1999 |
| JP | 2012-510923 A | 5/2012 |
| WO | 2006133950 A2 | 12/2006 |
| WO | 2010/066946 A2 | 6/2010 |

OTHER PUBLICATIONS

Wagner, Claus D.: Die Segelmaschine. Hamburg. Ernst Kabel Verlag GmbH, 1991, pp. 85, 156-159.—ISBN 3-8225-0158-1.

International Search Report from PCT/EP2011/065672 mailed Oct. 20, 2011 (2 pages).

International Search Report from PCT/EP2011/065984 mailed Feb. 16, 2012 (3 pages).

* cited by examiner

MAGNUS ROTOR COMPRISING A GUIDE ROLLER COVER

BACKGROUND

1. Technical Field

The present invention concerns a Magnus rotor having a guide roller cover.

2. Description of the Related Art

Magnus rotors are also referred to as Flettner rotors or sailing rotors.

Magnus rotors are known in the state of the art. Particularly as ship drives, they have also become known by the term Flettner rotors and equipping ships with such a Flettner rotor or Magnus rotor is described in the book "Die Segelmaschine" by Klaus D. Wagner which appeared in Ernst Kabel Verlag GmbH, Hamburg, 1991.

CH 116268 discloses a Magnus rotor having a guide with a plurality of guide wheels. The guide rollers can be arranged within the Magnus rotor and support it from the interior or also outside it in order to support the Magnus rotor from the exterior. Resilient tires like the wheels of motor vehicles are used as the guide rollers.

WO 2006/137844 A2 discloses a Magnus rotor having at least three guide rollers which are arranged at the lower outer periphery of the Magnus rotor and bear against it in play-free relationship. The guide rollers are covered with a segmented cover.

What is common to all the above-described covers for the guide rollers of a Magnus rotor is that they cover the guide rollers to protect them from fouling and damage and to prevent people or articles from coming into contact with the guide rollers and as a result being injured or damaged, precisely when a Magnus rotor is rotating. In that case those covers have to be removed to give access to the guide rollers protected therebeneath if they have to be replaced or maintained.

In that respect, providing access to the guide rollers under the covers and implementing maintenance and replacement of guide rollers by operating personnel represents a not inconsiderable complication and expenditure.

BRIEF SUMMARY

There is described a Magnus rotor having a carrier arranged in the interior of the Magnus rotor. The Magnus rotor has a rotor which rotates about the carrier in operation of the Magnus rotor. A bearing carries the rotor on the carrier. Beneath its guide rollers the Magnus rotor has a respective walkway surface which is also covered and protected when the cover is pivoted up. In the downwardly pivoted condition the cover exposes both the guide roller on which operations are to be effected and also the walkway surface thereof so that this surface can be walked upon or used for carrying out the operation and the operating personnel can safely perform maintenance or replacement from that walkway surface.

An advantage of that walkway surface is that this avoids the necessity for the personnel having to establish access to the corresponding guide roller for maintenance or replacement operations, by way of a ladder or working platform. It is precisely on the deck of a ship that such a ladder or working platform could be safeguarded against slipping or movement, only at a major level of complication and expenditure. In addition, in the case of a ship's deck which is always wet due to rain and spray it is never possible to completely eliminate the risk of slipping, which also causes for example ladders or working platforms to slip out of position. Thus ladders, working platforms and similar aids for reaching a guide roller always represent a source of danger to the operating personnel, which according to the invention can be avoided by the walkway surface provided beneath or beside the guide roller. In addition, beside a cover in the downwardly folded condition, there may be no space or scarcely any space to position a ladder or working platform there, or at least in such a way that access to the guide roller to be able to carry out the operations is possible therefrom. In addition, setting up and removing a ladder or a working platform represents additional complication which can be avoided by the provision of an integrated walkway surface. Thus the provision of the walkway surface according to the invention under the guide roller means that the operation in itself is not only safer but can also be carried out more easily and with a greater saving of time.

In accordance with an aspect of the invention the walkway surface is in the form of part of a base plate or a ship's deck or the like, on which the Magnus rotor is fixed. That ensures that the walkway surface cannot move relative to the ship's deck as it is in the form of part of the deck, that is to say it is a part of the ship's deck or also the foot or substructure of the Magnus rotor.

In a further aspect of the invention the walkway surface is provided with a surface or the surface is coated to prevent slipping on the walkway surface. That is advantageous to reduce the risk of slipping when walking on the walkway surface or standing thereon as it is precisely when carrying out operations on a ship's deck that the operating personnel is seriously endangered by tripping over or falling, for example by falling overboard.

In an aspect of the invention the cover has a motion device which is adapted to hold the cover in the opened condition at a vertical height above the walkway surface. That motion device on the one hand permits the cover or each cover segment to be folded up and down. On the other hand, that prevents the cover segment from being folded down or dropping down completely onto the underlying surface or the ship's deck as the cover segment can be held at a given height above the underlying surface or ship's deck by the motion device. In that case it is advantageous for that given height to be so selected that the cover segment is positioned at least partially above the walkway surface. That arrangement can provide that the cover segment in the folded-down condition affords protection for preventing a person who is on the walkway surface from falling onto the underlying surface or the ship's deck.

In a further aspect of the invention the motion device is adapted, in the opened condition of the cover, to extend in a substantially radial direction of the Magnus rotor from same to the opened cover above the walkway surface. As a result of that arrangement the folded-down cover rearwardly and/or the motion device towards the sides jointly or in each case alone form protection against a person on the walkway surface from falling down. That arrangement so-to-speak forms a working pulpit to afford a person on the walkway surface protection against falling down in all directions.

In an aspect of the invention the motion device is secured in the closed condition of the cover by means of an arresting device. That is advantageous as the cover can be secured by that arresting means and can be secured against accidental downward pivotal movement, that is to say opening, in particular when a ship on which the Magnus rotor is used is subject to a heavy swell. In addition each segment of the cover can be opened individually, that is to say pivoted downwardly, by means of that arresting arrangement. That arresting arrangement is advantageously accessible from the exterior and is to be quickly and easily operated without auxiliary means and tools, for example by a rotary movement through 90°.

BRIEF DESCRIPTION OF THE SEVERAL VIEWS OF THE DRAWINGS

Embodiments by way of example and advantages of the invention are described more fully hereinafter with reference to the following Figures.

DETAILED DESCRIPTION

Figure 1:
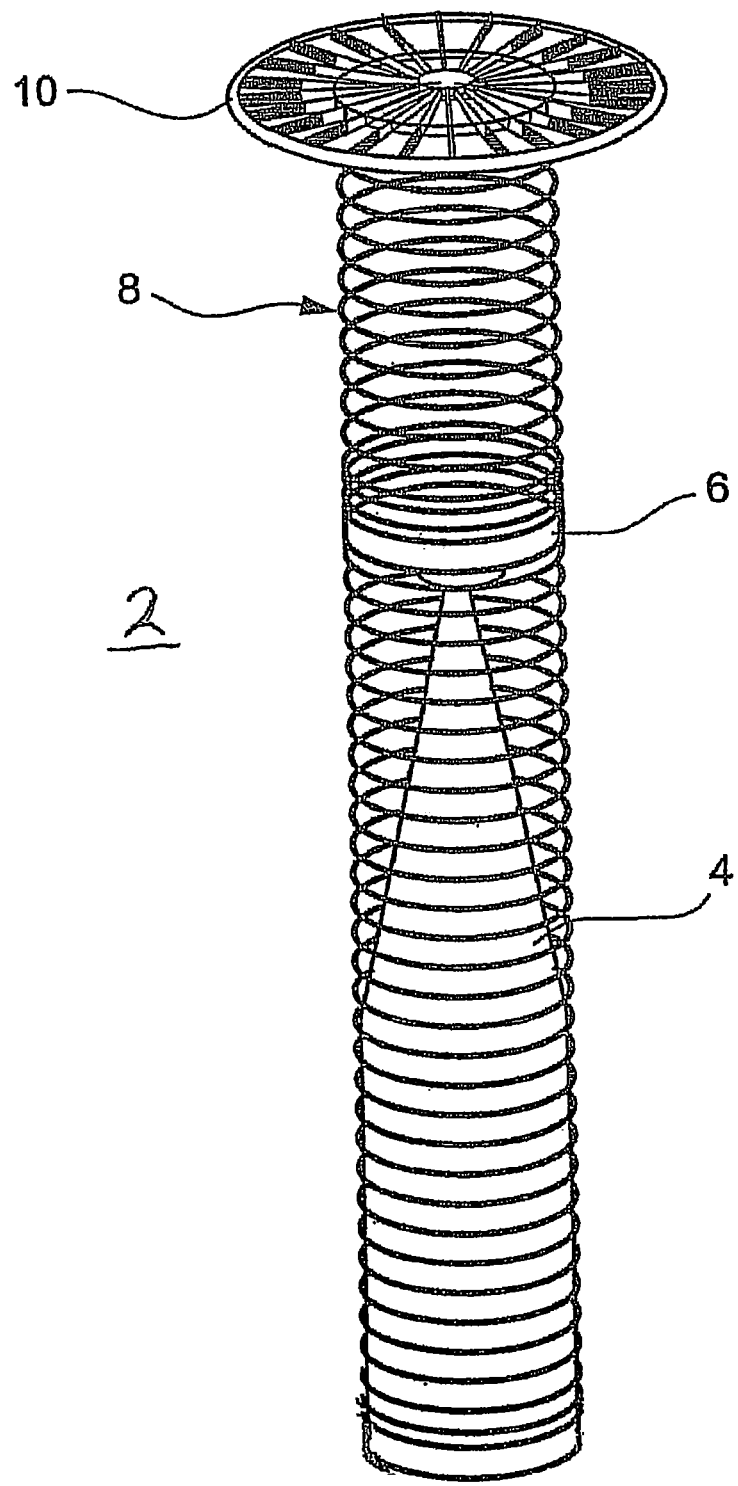
FIG. 1 shows a diagrammatic perspective view of a Magnus rotor.

FIG. 1 shows a diagrammatic perspective view of a Magnus rotor 2. The Magnus rotor 2 has a rotor 8 which is preferably cylindrical. An end plate 10 is mounted at the upper end of the rotor 8. Insofar as the Magnus rotor 2 is mounted on a base plate (not shown) such as for example a ship's deck or the like, a corresponding end plate is not required at its lower end as that is formed by the base plate or the deck itself. The rotor 8 is carried by a carrier 4 which is arranged in the interior of the rotor 8 and on which the rotor 8 rotates, by way of a bearing 6. The bearing 6 can be a known rolling bearing or any other suitable bearing configuration.

Figure 2:
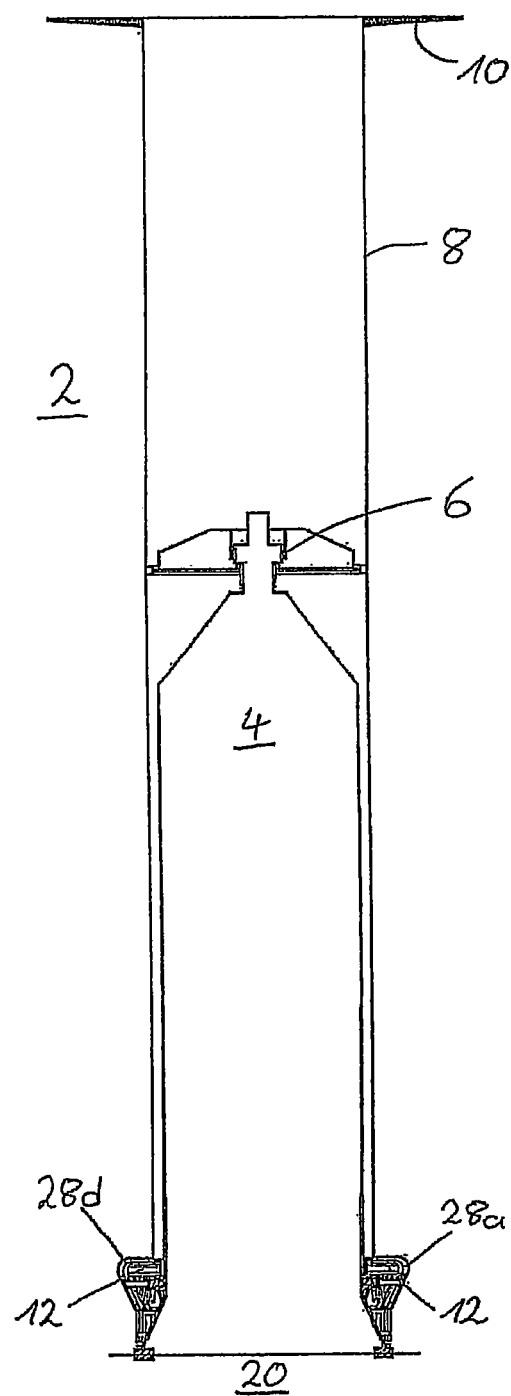
FIG. 2 shows a diagrammatic simplified side view of a Magnus rotor.

FIG. 2 shows a diagrammatic simplified side view of a Magnus rotor 2 with inwardly disposed carrier 4, the upwardly disposed rotor 8, the bearing 6 and the end plate 10. The Magnus rotor 2 is fixed on an underlying base structure 20 which can be a base plate, a ship's deck or the like. In addition FIG. 2 shows guide rollers 12 and covers 28a and 28d. The covers 28a and 28d cover the lower peripheral edge of the rotor 8 and the guide rollers 12 and on the one hand thus prevent foreign bodies from passing into the drive or the guide rollers 12 and on the other hand ensure that operating personnel cannot be injured at exposed rotating parts.

Figure 3:
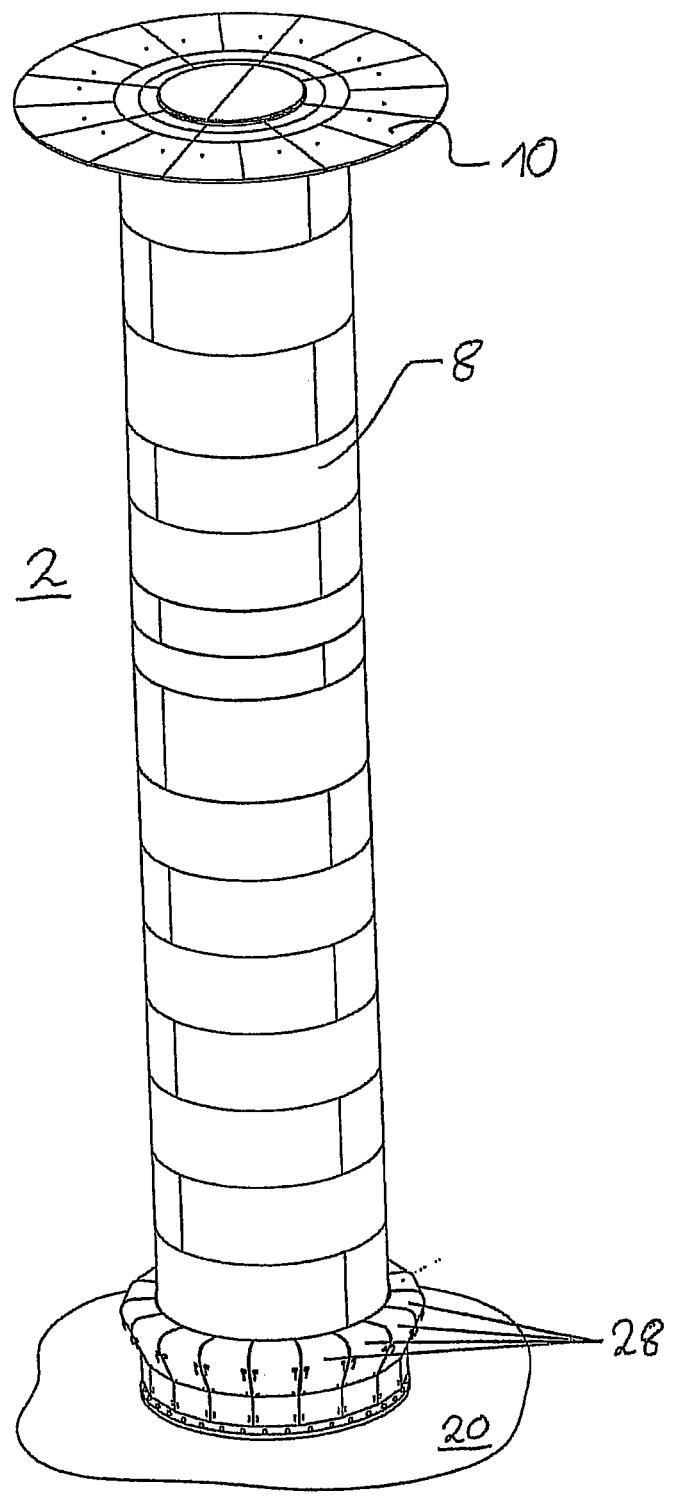
FIG. 3 shows a diagrammatic perspective view of a Magnus rotor.

FIG. 3 shows a diagrammatic perspective view of a Magnus rotor 2. In this case the rotor 8 is shown with a closed surface so that the carrier 4 is not shown. In this Figure the covers 28 are shown in a closed position, that is to say in an upwardly folded position, so that the covers 28 cover the guide rollers 12.

Figure 4:
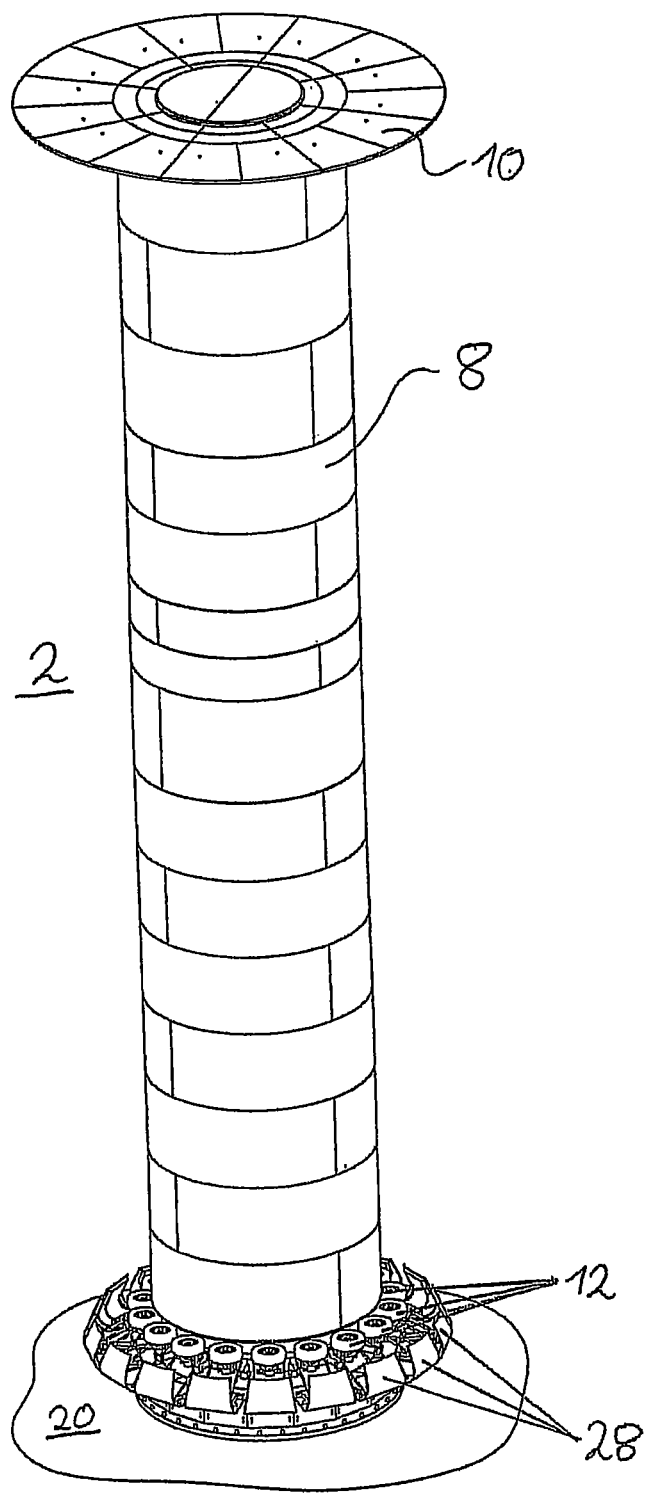
FIG. 4 shows a diagrammatic perspective view of a Magnus rotor.

FIG. 4 show a diagrammatic perspective view of a Magnus rotor 2 with the covers 28 opened, that is to say folded downwardly, thus opening a view onto the guide rollers 12 disposed therebeneath.

Figure 5:
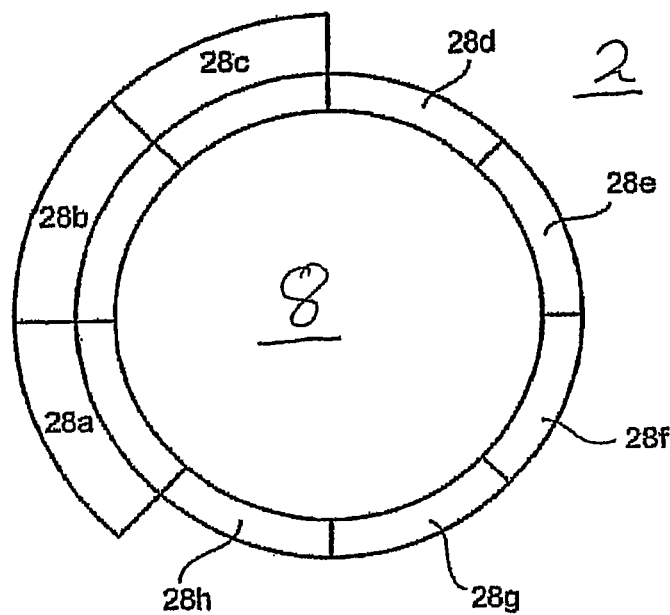
FIG. 5 shows a diagrammatic simplified view of cover segments of the guide rollers of a Magnus rotor.

FIG. 5 shows a diagrammatic simplified view of cover segments 28a to 28h of the guide rollers 12 of a Magnus rotor 2, in a plan view onto the rotor 8 without the end plate 10 and without illustrating the carrier 4 and the bearing 6. Covers 28a to 28h are arranged around the outer periphery of the rotor 8. In this case the covers 28a, 28b and 28c are covers, below which the guide rollers 12 are arranged, while the covers 28d to 28h cover the guide rollers 12. Due to the segmenting, it is not necessary for the entire cover to be removed every time in order to have access to individual parts of the drive and guide system.

Figure 6:
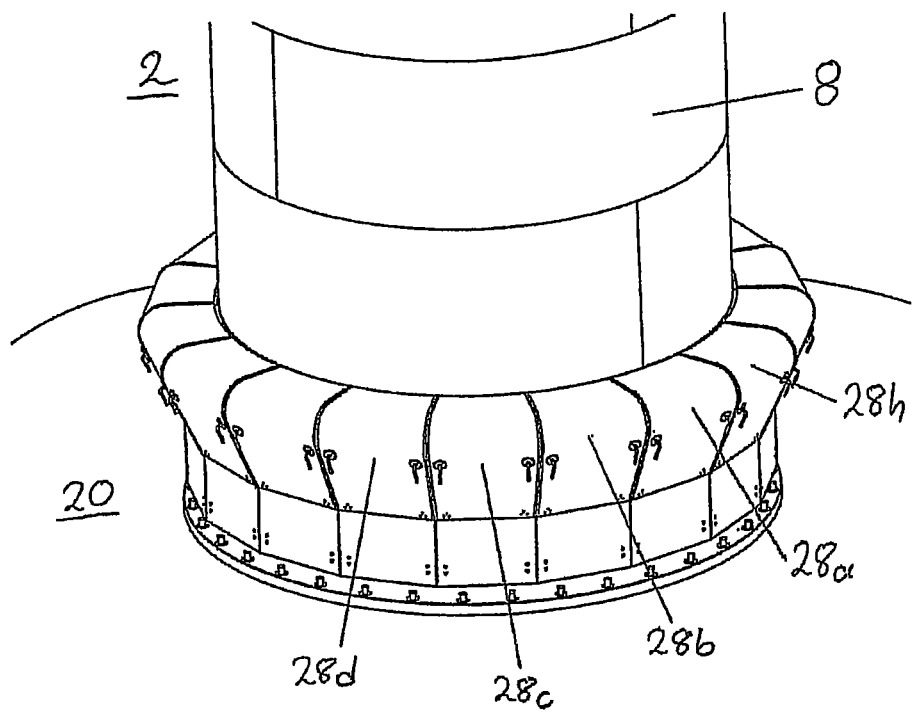
FIG. 6 shows a view of a Magnus rotor whose cover segments of the guide rollers are closed.

FIG. 6 shows a view of a Magnus rotor 2 whose cover segments 28a to 28h for the guide rollers 12 are closed. This shows the lower region of a Magnus rotor 8 which is fixed on an underlying base structure 20 like the deck of a ship.

Figure 7:
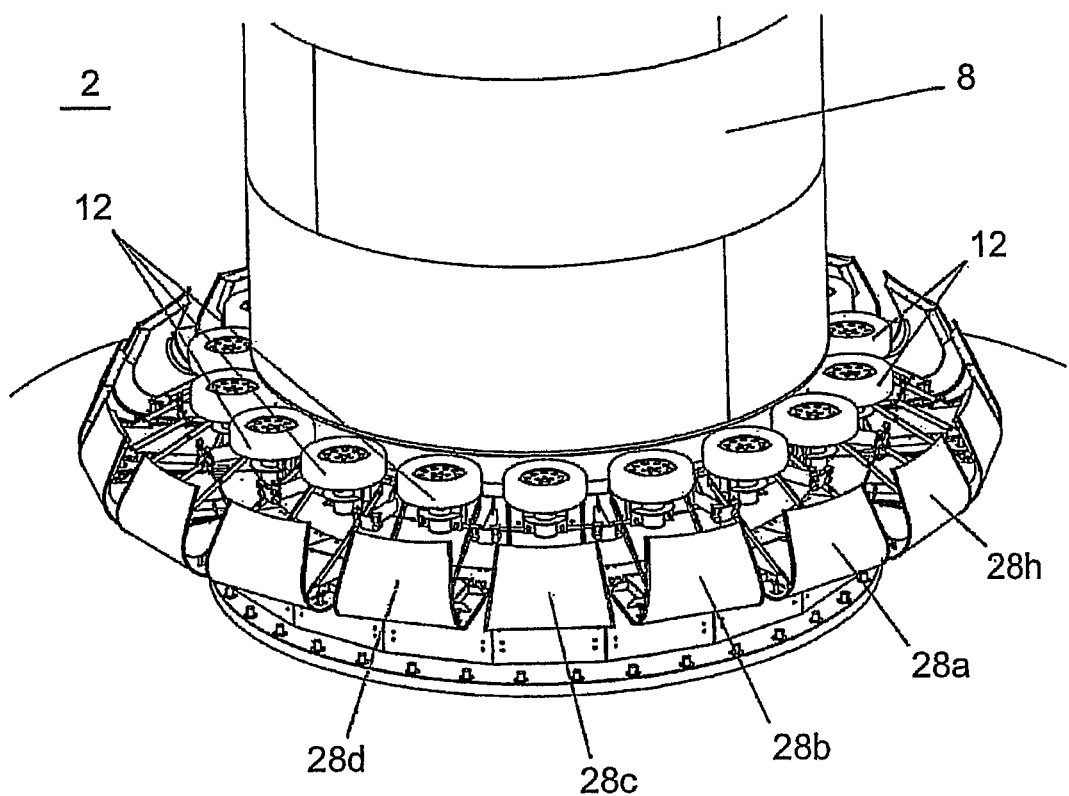
FIG. 7 shows a view of a Magnus rotor whose cover segments of the guide rollers are partially opened.

FIG. 7 shows a view of a Magnus rotor 2 whose cover segments 28a to 28h of the guide rollers are partially opened. In this case the cover segments 28a to 28c are opened, that is to say pivoted downwardly in the direction of the underlying base structure 20 like a ship's deck. It is possible to see the guide rollers 12, wherein each guide roller 12 can be covered under a respective one of the cover segments 28a to 28h.

Figure 8:
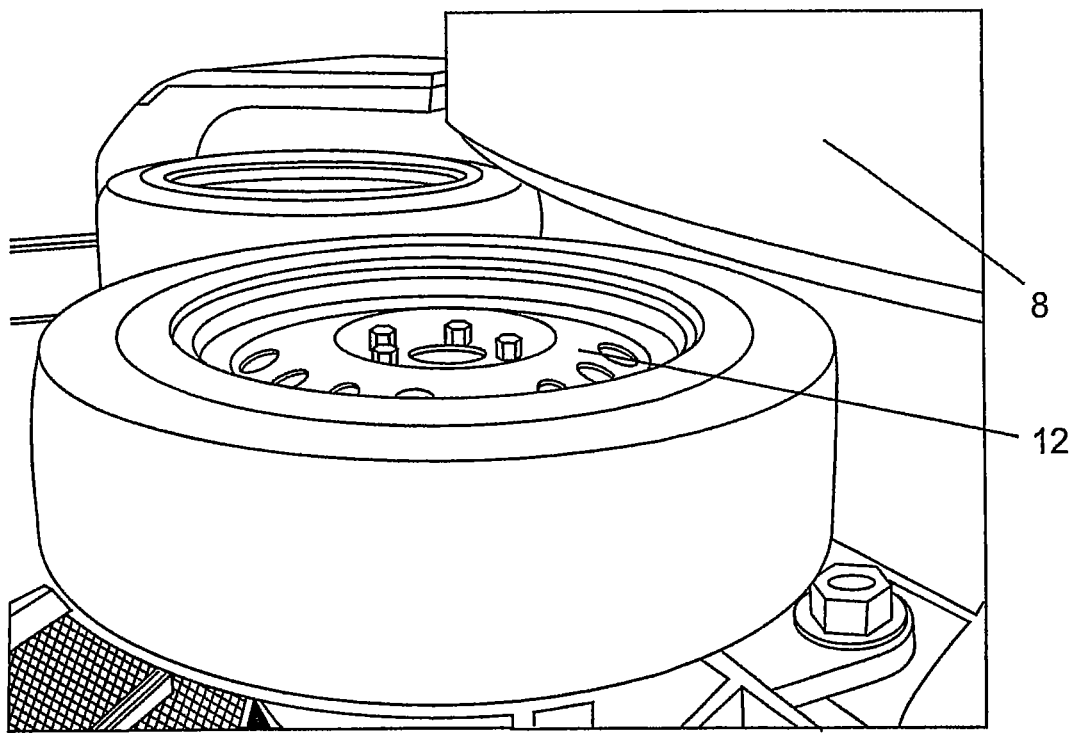
FIG. 8 shows a view of guide rollers of a Magnus rotor.

FIG. 8 shows a view of guide rollers 12 of a Magnus rotor 2. Tires of motor vehicles can be used as the guide rollers 12. In this case profile-less tires are to be used to reduce the generation of noise when the rotor 8 is moving. The guide rollers 12 are mounted on an axis of rotation oriented parallel to the axis of rotation of the Magnus rotor 2. They are provided at the lower peripheral edge of the rotor 8. The guide rollers 12 are distributed over the entire periphery of the rotor 8 and bear in play-free relationship thereagainst. Even if therefore a tilting moment should occur for example due to a gust of wind and the fact that the bearing is arranged relatively high (see for example FIG. 2), that cannot lead to a swinging movement of the rotor 8 as the guide rollers 12 reliably prevent that. This ensures that the rotor 8 always performs a precise rotary movement.

A substantial advantage of this guide system lies in its good accessibility and its simple structure. In that respect the structure of the guide rollers 12, due to the use of motor vehicle tires, corresponds to the structure of a wheel suspension in a motor vehicle. Therefore the manner in which the guide rollers 12 are mounted is familiar and known, and for that reason replacement of the guide rollers 12 can be effected very easily and without requiring tools or special training for same as it is only necessary to have the same tool as when changing a tire on a motor vehicle.

It is also advantageous that the guide rollers 12 are disposed outside the rotor 8. Thus no parts which wear or can be damaged are disposed on the rotor 8. Replacement of guide rollers 12 is also possible without any problem as the guide rollers 12 are accessible from the exterior. Maintenance is also simplified as it is possible to carry out a visual check even in ongoing operation as the operator does not have to step into the interior of the Magnus rotor 2. In that way it is possible to remove faults at a low level of complication and expenditure.

Figure 9:
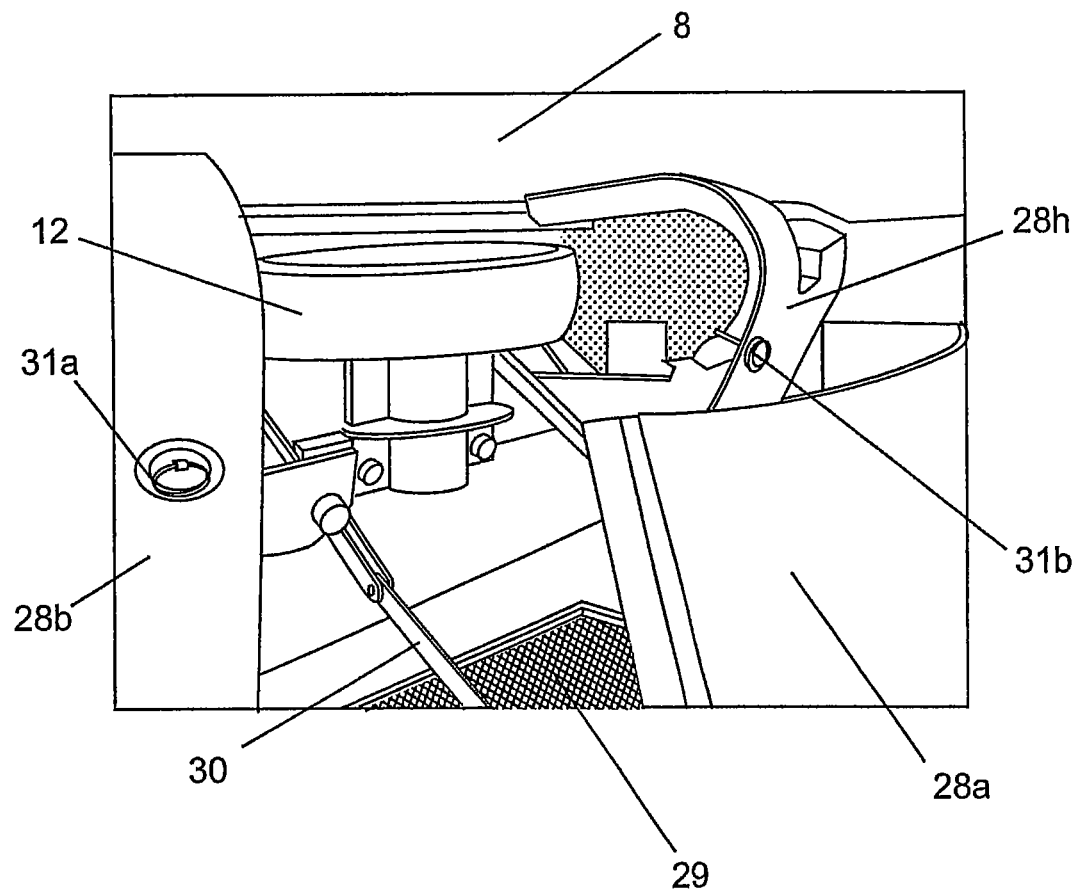
FIG. 9 shows a view of a guide roller of a Magnus rotor, whose cover segment is opened.

FIG. 9 shows a view of a guide roller 12 of a Magnus rotor 2 whose cover segment 28a is opened. The adjacent cover segments 28b and 28h are closed. In this case the cover segment 28a is pivoted downwardly so far that a walkway surface 29 beneath the guide roller 12 is visible. That walkway surface 29 is provided beneath the guide roller 12 and is also covered by the cover segment 28a when the latter is pivoted up over the guide roller 12 and closed. Rods 30 are provided at both sides of the cover segment 28a for pivoting the cover segment 28a up and down. The cover segment 28a is secured in the upwardly pivoted position by means of two levers 31a and 31b.

Figure 10:
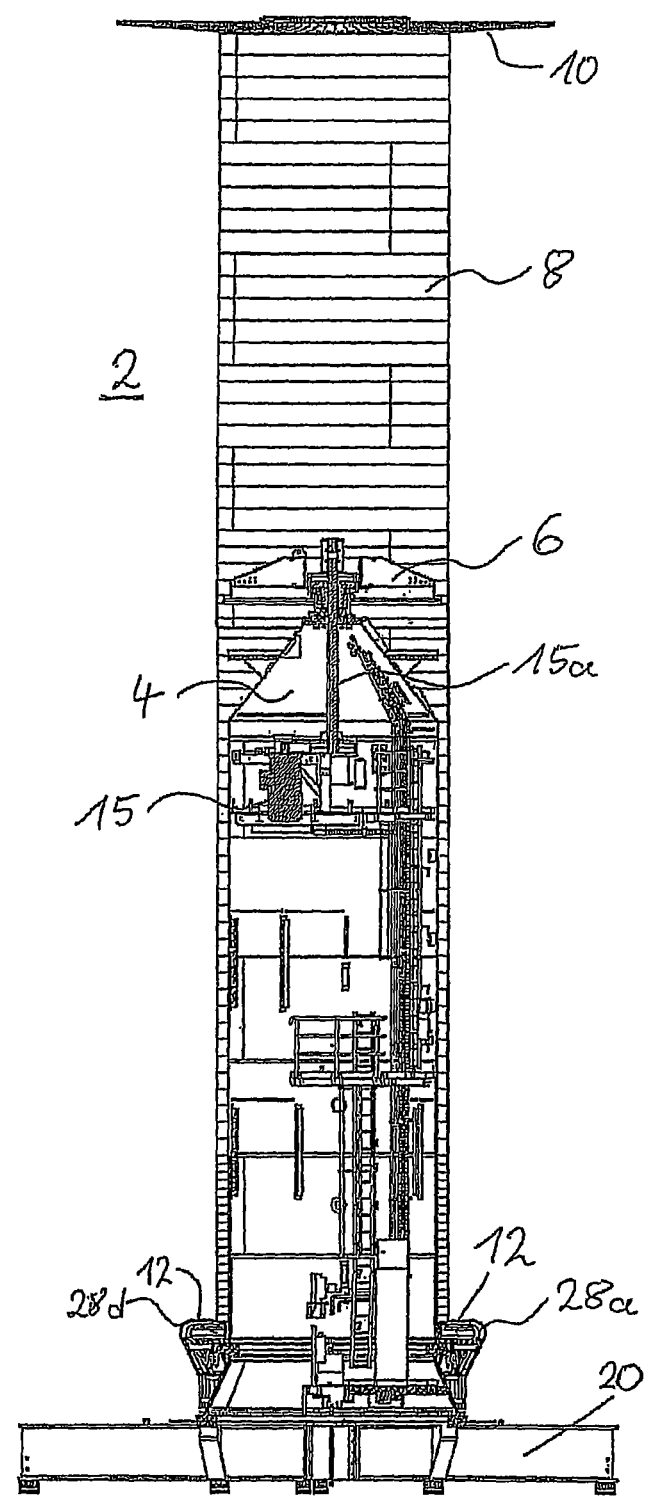
FIG. 10 shows a detail view of a Magnus rotor.

FIG. 10 shows a detail view of a Magnus rotor 2. This view shows the rotor 8 with end plate 10. The rotor 8 of the Magnus rotor 2 is supported with the bearing 6 on the inwardly disposed carrier 4. Shown in the lower region of the rotor 8 are the guide rollers 12 and their covers 28, here the cover segments 28a and 28d. In addition, arranged in the interior of the carrier 4 is a drive 15 which drives the rotor 8 by means of a drive shaft 15a which is passed through the bearing 6 from the carrier 4 into the rotor 8. In this case the rotor 8 and the drive shaft 15a have the same axis of rotation.

A substantial advantage of the cover 28 for the guide rollers 12 is on the one hand that the individual cover segments 28a to 28h can be closed and opened, that is to say pivoted up and down, independently of each other. In that way individual guide rollers 12 can be maintained or replaced without in that case the entire cover 28 having to be removed and re-fitted.

In addition the walkway surface 29 makes it possible to perform maintenance or replacement of a guide roller 12 from a safe working position for the operating personnel. Thus the walkway surface 29 is in the form of a component part of the lower region of the Magnus rotor 2 or is fixedly mounted thereto. In that way, even in the event of severe movements of the ship, the walkway surface cannot experience any relative movement with respect to the Magnus rotor 2 and the guide rollers 12, by which the personnel working on the guide roller 12 and standing on the walkway surface 29 could be endangered. That avoids the necessity for the personnel for maintenance or replacement operations having to gain access to the corresponding guide roller 12 by way of a ladder or working platforms which always represent a source of danger for the operating personnel, precisely on a wet and thus slippery deck surface of a ship.

The cover segment 28a can be operated, that is to say pivoted up and down, easily and in a space-saving fashion, by virtue of the rods 30. In addition the rods are so provided that they hold the cover segment 28a in a position in which it is pivoted downwardly so far that the cover segment 28a is held at a height such that the cover segment 28a forms a parapet in a radial direction, that is to say behind a person standing on the walkway surface 29, that is to say it affords protection against falling down off the walkway surface towards the rear. In that case the rods 30 serve as lateral protection against falling off. In that fashion the downwardly pivoted cover segment 28a and the rods 30 give the operating personnel on the walkway surface 29, for example when working on the guide roller, a protected region in which the working operations can be carried out in relative safety, that is to say the personnel is protected from falling off, at least towards the side and towards the rear. That is particularly advantageous when using a Magnus rotor 2 on a ship as falling down can then easily end in falling overboard.

The use of two levers 31a and 31b is advantageous to secure the cover segment 28a on both sides and thus to distribute the loading uniformly to both sides of the cover segment 28a. The levers 31a and 31b which are accessible from outside the cover segment 28a provide that the cover segment 28a can be operated easily, accessibly, and quickly and by a person without a tool or auxiliary means. In this case the levers 31a and 31b can be so provided that they can be turned by a 90° rotation about their axis of rotation perpendicularly to the outside surface of the cover segment 28a in that region to release and close their arresting action.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A Magnus rotor comprising:
a rotor body having an interior;
a carrier arranged in the interior of the rotor body;
a bearing the rotatably couples the rotor body to the carrier, the rotor body being configured to rotate about the carrier;
a plurality of guide rollers arranged at a lower outer periphery of the rotor body, each guide roller bearing being configured to press against the rotor body in a play-free relationship;
a walkway surface arranged beneath and outward of the guide rollers; and
a plurality of covers that cover the plurality of guide rollers, respectively, and the walkway surface when in a closed position, each of the plurality of covers including at least one rod that is configured to pivot the respective cover between the closed position and an open position and hold the respective cover in the open position so that the cover is located outwardly of the respective guide roller and exposes the walkway surface, wherein in the open position at least a portion of the plurality of covers are raised relative to the walkway to provide a protective barrier adjacent to the walkway.

2. The Magnus rotor according to claim 1 wherein the walkway surface is one of a base plate and a ship deck.

3. The Magnus rotor according to claim 1 wherein the walkway surface is coated with a nonslip material.

4. The Magnus rotor according to claim 1 wherein the rod of each cover holds the respective cover in an open position in a substantially radial direction of the rotor body.

5. The Magnus rotor according to claim 1 wherein the covers are configured to be secured in the closed position by an arresting device.

6. The ship according to claim 1 wherein each covers is configured to be opened individually to expose the respective guide roller.

7. The Magnus rotor according to claim 1 wherein the walkway extends around the lower periphery of the rotor body, wherein when the plurality of covers are in the closed position, the walkway is completely covered by the plurality of covers.

8. A ship comprising:
at least one Magnus rotor secured to a deck of the ship, each Magnus rotor including:
a rotor body having an interior;
a carrier arranged in the interior of the rotor body;
a bearing the rotatably couples the rotor body to the carrier, the rotor body being configured to rotate about the carrier;
a plurality of guide rollers arranged at a lower outer periphery of the rotor body, each guide roller bearing being configured to press against the rotor body;
a walkway surface arranged beneath and proximate to the guide rollers; and a plurality of covers that cover the plurality of guide rollers, respectively, and the walkway surface when in a closed position, and when the cover is in an opened position the cover exposes the respective guide roller and the walkway surface, each of the plurality of covers including at least one rod that is configured pivot the respective cover between the open and closed positions and hold the respective cover in the open position such that the respective cover is located outwardly of the walkway and so that at least a portion of the cover raised relative to the walkway to provide a protective barrier adjacent to the walkway.

9. The ship according to claim 8 wherein the walkway surface is part of the deck of the ship.

10. The ship according to claim 8 wherein the walkway extends around the lower periphery of the rotor body, wherein when the plurality of covers are in the closed position, the walkway is completely covered by the plurality of covers.

11. A Magnus rotor comprising:
a rotor body having an interior;
a carrier arranged in the interior of the rotor body;
a bearing the rotatably couples the rotor body to the carrier, the rotor body being configured to rotate about the carrier;
a plurality of guide rollers arranged at a lower outer periphery of the rotor body, each guide roller bearing being configured to press against the rotor body;
a walkway located adjacent to and below the plurality of guide rollers; and
a plurality of covers that are configured to pivot between a closed position and an open position, the plurality of covers being configured to cover the guide rollers and the walkway in the closed position and to expose the guide rollers and the walkway in the opened position, each of the plurality of covers including at least one rod that is configured to hold the respective cover in the open position, wherein when the plurality of covers are held in the open position, the plurality of covers located outward from the walkway and have a height that is greater than the walkway to provide a barrier adjacent to the walkway.

12. The Magnus rotor according to claim 11 wherein each of the covers is configured to be opened individually to expose the respective guide roller.

* * * * *